United States Patent [19]

Linde et al.

[11] Patent Number: 5,484,481

[45] Date of Patent: Jan. 16, 1996

[54] PROCESS FOR THE COLOURATION OF BUILDING MATERIALS

[75] Inventors: Günter Linde, Krefeld; Manfred Eitel, Kempen, both of Germany

[73] Assignee: Bayer AG, Leverkusen, Germany

[21] Appl. No.: 323,739

[22] Filed: Oct. 17, 1994

[30] Foreign Application Priority Data

Oct. 27, 1993 [DE] Germany .......................... 43 36 613.9

[51] Int. Cl.$^6$ ................. C04B 14/00; C09C 1/22; C09C 1/34; C09C 1/36
[52] U.S. Cl. ................. 106/712; 106/456; 106/460; 106/436; 106/447; 106/499; 106/504; 106/453; 106/281.1; 106/283; 106/284.1; 106/903
[58] Field of Search ................. 106/712, 281.1, 106/284.1, 283, 400, 436, 453, 456, 460, 499, 502, 504, 447, 903, 902

[56] References Cited

U.S. PATENT DOCUMENTS

| | | | |
|---|---|---|---|
| 2,167,432 | 7/1939 | Cox et al. ................. | 23/239 |
| 4,127,421 | 11/1978 | Ferrill, Jr. ................. | 106/433 |
| 4,277,288 | 7/1981 | Lawrence et al. ................. | 106/453 |
| 4,725,317 | 2/1988 | Wheeler ................. | 106/404 |
| 4,909,851 | 3/1990 | Morris et al. ................. | 106/400 |
| 4,946,505 | 8/1990 | Jungk ................. | 106/712 |
| 5,215,583 | 6/1993 | Krockert et al. ................. | 106/712 |

FOREIGN PATENT DOCUMENTS

| | | |
|---|---|---|
| 0268645 | 6/1988 | European Pat. Off. . |
| 0365046 | 4/1990 | European Pat. Off. . |
| 0507046 | 10/1992 | European Pat. Off. . |
| 2076134 | 10/1971 | France . |
| 2132724 | 11/1972 | France . |
| 2018912 | 6/1979 | France . |
| 2622483 | 5/1989 | France . |
| 3619363 | 12/1987 | Germany . |
| 3918694 | 10/1990 | Germany . |

OTHER PUBLICATIONS

Orbit Abstract of FR-A-2,132,724 (Nov. 24, 1972).
Orbit Abstract of FR-A-2,018,912 (Jun. 26, 1970).
Orbit Abstract of FR-A-2,076,134 (Oct. 15, 1971).
Orbit Abstract of FR-A-2,622,483 (May 5, 1989).
Orbit Abstract of EP-507046 (Oct. 7, 1992).
Orbit Abstract of DE-3918694 (Oct. 25, 1990).
Orbit Abstract of EP-365046 (Apr. 25, 1990).
Orbit Abstract of EP-268645 (Jun. 1, 1988).
Orbit Abstract of DE-3619363 (Dec. 10, 1987).
*The Shell Bitumen Handbook*, Published by Shell Bitumen U.K., pp. 230–232 (1990). (no month).
DIN 5033, *Colorimetry; basic concepts* (Mar. 1979).
DIN 5033, *Colorimetry; Standard colormetric systems* (May 1992).
DIN 5033, *Colorimetry; Colormetric measures* (Jul. 1992).
DIN 5033, *Colorimetry; Spectrophotometric method* (Jul. 1992).
DIN 5033, *Colorimetry by visual matching* (Jan. 1981).
DIN 5033, *Colorimetry; tristimulus method* (Aug. 1976).
DIN 5033, *Colorimetry; measuring conditions for object colours* (Jul. 1983).
DIN 5033, *Colorimetry; measuring conditions for light sources* (Apr. 1982).
DIN 5033, *Colorimetry; reflectance standard for colorimetry and photometry* (Mar. 1982).
DIN 6174, *Colorimetric evaluation of colour differences of surface colours according to the CIELAB formula* (Jan. 1979).
DIN 51 506, *Lubricants; VB and VC lubricating oils with and without additives and VDL lubricating oils; classification and requirements* (Sep. 1985).
DIN 51 562, *Viscometry, measurement of kinematic viscosity by means of the Ubbelohde viscometer; standard type* (Jan. 1983).
DIN 51 562, *Viscometry; measurement of kinematic viscosity by means of the Ubbelohde viscometer; micro Ubbelohde viscometer* (Dec. 1988).
DIN 51 562, *Viscometry; measurement of kinematic viscosity by means of the Ubbelohde viscometer; viscosity relative increment at short flow times* (May 1985).

*Primary Examiner*—Mark L. Bell
*Assistant Examiner*—Michael Marcheschi
*Attorney, Agent, or Firm*—Connolly & Hutz

[57] ABSTRACT

The present invention relates to a process for the coloration of building materials such as concrete or asphalt by granulated inorganic pigments.

17 Claims, 1 Drawing Sheet

PROCESS FOR THE COLOURATION OF BUILDING MATERIALS

The present invention relates to a process for the coloration of building materials such as concrete or asphalt by granulated inorganic pigments.

In order to achieve the optimum color effect, the processing of pigments requires a grinding of the pigments to primary particles. The powders formed as a result of this give off dust very strongly and tend to adhesion, owing to their fine state of division, and stick in dosing systems. In the case of toxicologically dangerous substances, therefore, measures must be taken during the processing to avoid the endangering of man and environment by the dusts formed. However, even in the case of completely harmless, inert substances such as iron oxide pigments, the avoidance of dust nuisance is increasingly required by the market.

The objective in the handling of pigments is therefore the avoidance of dust and improved dosing based on good flow properties in order to achieve a qualitatively uniform colour effect on use in building materials. This objective is reached to a greater or less extent by the application of granulation processes to pigments. Pelletizing or spray granulation are generally used in this connection. Compacting processes have been less suitable up to now because of the limited dispersibility of the granulated materials obtained thereby.

When granulated pigments are used, the market basically demands of the pigments two properties in opposite directions: mechanical stability of the granulated material and good dispersion properties. The mechanical stability is responsible for good transport properties, both for transport between manufacturer and user and for good dosing and flow properties during the use of the pigments. It is brought about by high adhesive forces and depends e.g. on the amount of binder or else on the compaction pressure during the change of shape. The dispersibility, on the other hand, is influenced by a good grinding before the granulation (wet and dry grinding), the mechanical energy during the working-in (shear forces) and dispersion aids, which at once reduce the adhesive forces in the dry granulated material during the working into a medium. In pigments, though, the use of fairly large quantities of dispersion aids is restricted owing to the cost ratio additive/pigment. In addition, a high proportion of additive causes a corresponding reduction of the tinting strength or of the scattering power. Since the fluctuations of tinting strength are in general below ±5%, the use of additives is also limited, even when they act simultaneously as adhesion promoter and dispersion aid. The additives must also not adversely change the use properties of the media to be colored, for example the strength or the setting behavior in the case of concrete or the compressive strength or abrasion resistance in the case of asphalt.

Possible production processes for granulated building materials according to the prior art are spray granulation (spray drying via disc or nozzle) and pelletizing (mixer, fluidized bed granulator, pan or drum).

Granulation by spray drying starts out from pigment suspensions with the use of binders. Water-soluble binders are used in this connection. Thus, the starting point in DE-A 3 619 363, EP-A 0 268 645 and EP-A 0 365 046 is organic substances such as lignin sulphonates, formaldehyde condensates, gluconic acid and sulphated polyglycol ethers, while according to DE-A 3 918 694 and U.S. Pat. No. 5 215 583 the starting point is inorganic salts such as silicate and phosphate. A combination of spray drying and pelletizing has also been described in EP-A 0 507 046.

In DE-A 3 619 363 (column 3, lines 44–47) and EP-A 0 268 645 (column 7, lines 18, 19), the application of a compacting process is expressly excepted. In this process a strong cohesion is achieved by the application of pressure, so that a good stability in transport is certainly achieved, but dispersion properties are simultaneously reduced also.

The other processes; also are restricted in their application. Spray granulation requires the use of suspensions of good fluidity and therefore low viscosity on account of drop formation. For the drying process, therefore, a greater amount of water has to be evaporated than in the fluidized bed drying from highly pressure-dried pigment filter pastes, which can frequently be used. This leads to higher energy costs. In the case of pigments previously produced by calcination, spray granulation signifies an additional process step with high energy costs. In addition, during spray granulation a more or less large proportion of fine material accumulates in the spray filter and must be recycled again into the production.

Frequently, pelletizing also has disadvantages. Starting from pigment powder, it can be carried out in mixers with high turbulence, in the fluidized bed process or also by pan and drum granulation. All these processes have in common a high requirement for binder, usually water, so that drying must follow as an additional process step.

Granulated materials of different sizes also are obtained in this case, especially when insufficient binder is available for the amount of powder or the current distribution is not the optimum. A certain proportion can then become too large as granulated material, while on the other hand components which are too small and therefore still dusty are present. A classification of the granulated materials formed is therefore necessary, with the recycle of over- and undersize materials.

Pan granulation leads to granulated materials with a broad particle-size spectrum. Where this is undesirable because of the poor dispersibility of too large particles, the granulation process must be followed by intensive personal supervision and the production of granulated material optimized by manual control of the amount of nuclei. Usually a classification, with recycle of the over- and undersize material, occurs in this process also.

It was, however, the object of the present application to provide a process that avoids the previously described disadvantages of spray granulation or of pelletizing in their application to inorganic pigments and provides sufficiently stable, dosable, low-dust granulated materials of equally good dispersibility as the powders previously used. Furthermore, a classification with recycle of over and undersize material should be avoided.

It has now been found that this object can be achieved by a multistage combination of the process stages of mixing, compacting, screen granulating and pan granulating.

The invention accordingly provides a process for the coloration of building materials such as concrete or asphalt by granulated inorganic pigments, characterized in that inorganic pigments are mixed with binders with formation of a cohesive powder, this cohesive powder is subjected to a compacting stage with line forces of 0.1 to 15 kN/cm, the flakes formed, of a density of 0.5 to 3.0 g/cm$^3$, are broken down on a screen granulator into nuclei and powder and these completely pelletized by rerolling on a rotating pan or in a rotating drum dried and mixed with the building materials.

According to the process of the invention, granulated pigment is obtainable that at a $d_{50}$ of 0.2 to 2 mm can be worked into building materials without difficulty.

Preferred inorganic pigments for the purposes of this invention are iron oxide, titanium dioxide, chromic oxide and/or rutile mixed-phase pigments.

Substances improving the adhesive forces (cohesion) are used as binders. Water and aqueous solutions are available as such. In addition to the aforementioned binders used in the prior art, binders, such as, aqueous solutions of polysaccharides, aqueous solutions of cellulose ethers and aqueous solutions of at least one inorganic salt selected from the group consisting of phosphates, silicates, aluminates and borates can be used. For working into aqueous building material systems such as cement mortar and concrete, surprisingly, not only can substances soluble in water be used but also water-insoluble binders, e.g. oils, can advantageously be applied as binders. At the same time, oils of different origins can be used. In addition to technical or synthetic oils such as Machine Oil V 100, and refined crude oils biodegradable oils of vegetable and animal origin such as rapeseed oil, soya bean oil, maize germ oil, olive oil, coconut oil, sunflower oil or fish oil can also be used. The preferred oils used have a kinematic viscosity of 1.6 to 1500 mm$^2$/s at 40° C. according to DIN 51 562.

In the preferred embodiment, the binders are used in amounts between 0.1 to 10 wt. %. If the binders are organic or oils, they are preferably, used in amounts of between 0.01 to 6 wt. %.

Figure 1:
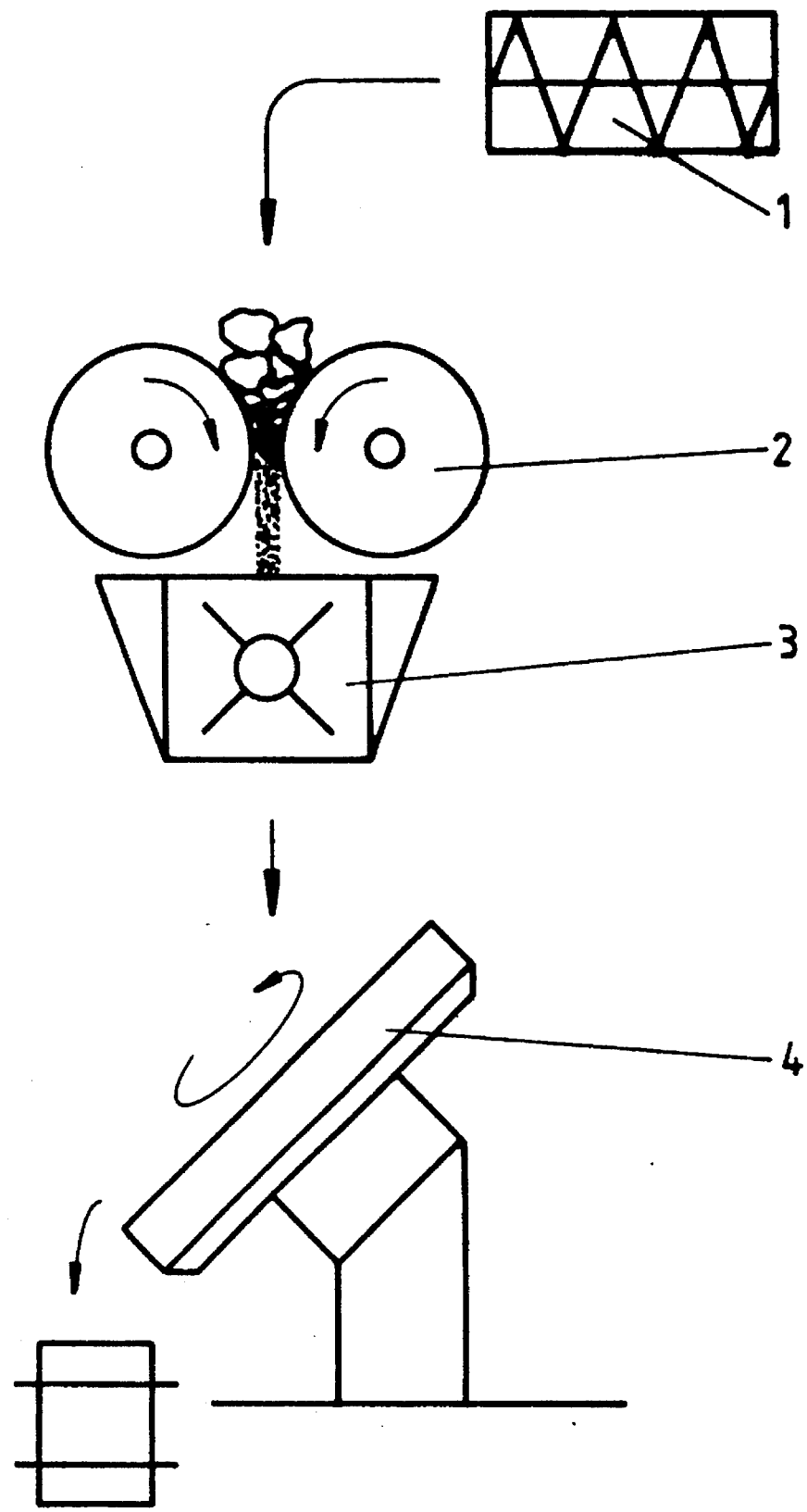
FIG. 1 shows the sequence of apparatuses that are used in the process of the present invention.

Preferred embodiments are put forward in the sub-claims.

It is essential in the multistage granulation process according to the invention that in the first stage a sufficiently cohesive homogeneous material be produced by addition of the binder in a mixer. In the second stage a compacting occurs.

The most important characteristic with regard to process engineering is the compressive force (kN) per cm width of roll (line force). A linear transfer of the compressive force in the compacting is assumed, since an area of compression cannot be defined and a pressure (kN/cm$^2$) therefore cannot be calculated.

The compaction should preferably be carried out with very low line forces. The line forces used are in general in the lowest range of the commercially available equipment, for example between 0.1 and 15 kN/cm. The adhesive forces within the flakes together with the conditions in the following screen granulator (e.g. the flake crusher of Bepex GmbH, D-74211 Leingarten or the firm of Frewitt, Fribourg/Switzerland) determine the size of the pregranulate (nucleus) and the ratio between nucleus and powder. The line forces preferably amount to 0.5 to 10 kN/cm.

The optimum particle size of the granulated materials for building material is set by this ratio and the residence time in the following pelletizing. At the same time, as a result of the correct ratio between pregranulate and powder, practically the whole amount of pigment is converted into free-flowing, low-dust granulated material. The recycle of over- and undersize material is omitted.

This pelletizing by rerolling can be carried out according to the prior art without any problem by the person skilled in the art on ordinary commercial rotating pans, dragee drums or rotating drums.

The testing of the dispersibility for building materials is carried out in cement mortar according to the following method: in concrete it is carried out by the measurement of tinting strength on prisms prepared with white cement according to the following data: cement/quartz sand ratio 1:4; water-cement value 0.35; pigmentation level 1.2%, based on cement; mixer used from RK Toni Technik, Berlin, with 5-1 mixing bowl, model 1551, rotation speed 140 rpm, charge 500 g of cement. After 100 s, 3 samples of mixture (300 g) are taken and test pieces (5×10×2.5 cm) prepared under pressure (300 bar). Curing of the test pieces: 24 hours at 30° C. and 95% relative atmospheric humidity with subsequent drying for 4 hours at 60° C. Color data measurement by means of Dataflash 2000 Datacolor International, Köln, 4 measurement points per brick, 12 measurement points per pigment mixture. The average values obtained are compared with the values of a reference sample. The color difference $E_{ab}$ and the tinting strength (reference sample=100% are evaluated (DIN 5032, DIN 6174). The dispersibility is designated as good for a difference of 5% in tinting strength compared with the reference sample, and as satisfactory for a difference of up to 10%.

The dispersibility in asphalt is tested according to the following method: the pigment/granulated pigment is mixed in a heatable laboratory mixer (Rego-Mischer) together with a roadbuilding bitumen of Type B 80 (commercial product of Shell AG) and aggregates for 60 seconds at 180° C. Marshall test pieces are prepared with the mixture ("The Shell Bitumen Handbook", Shell Bitumen U. K., 1990, p.230– 232). Differences in color between the Marshall test pieces and a prescribed reference specimen are evaluated colorimetrically (Minolta Chromameter II, Standard Illuminant C, Cielab System, DIN 5033, DIN 6174) by comparison of the red values a*. Differences in the a* values of less than 0.5 units are visually indistinguishable.

The transportability is tested in a dosing unit (PB 650 with NW 150 screw) of the firm of Würschum. The procedure in this case is to dose ca. 100 kg of granulated material repeatedly in succession via the unit until the material can no longer be transported. Well flowable and well transportable granulated materials show so little abraded material after one passage through the unit that a second passage can be added without difficulty; stable granulated materials are accordingly those that can be transported twice or more times in the unit described.

The flow behavior is tested by examining the outflow behavior from a funnel with 300 to 1000 ml volume and an 8 mm opening. The flow behavior is designated as good if the material runs out freely. If the material does not flow, or does so only after knocking, the flow behavior is considered inadequate.

In the process according to the invention, different granulation apparatuses, which are known as individual processes, are used in succession in special coordination with each other in a particular sequence (FIG. 1). These are a mixer (1), a compactor (2), a rough-grinder (3) and a rotating pan (4). These individual processes alone or in other combinations do not lead to the granulated materials according to the invention with the advantageous properties with regard to yield (practically no dust component), flow behavior, transportability, dispersibility and little effort on control during production. This is made clear in the following table, wherein the sum of the positive properties should be considered (Table 1).

The present invention is explained in the following by means of examples, which are not to be regarded as limiting it.

EXAMPLE 1

100 kg iron oxide red Bayferrox 130 (commercial product of Bayer AG) were charged with 3% (3 kg) Machine Oil V 100 (lubricating oil according to DIN 51506, kinematic viscosity at 40° C. (DIN 51 562) 100 mm²/s) to a mixer and intensively mixed. This mixture was compacted in a compactor (Pharmapaktor Bepex 200/50) at line forces <3 kN/cm. The flakes formed, with a thickness of 2–3 mm, are rough-ground in the screen granulator with a screen of 2 mm mesh width. The pregranulate was granulated with the powder arising during the rough-grinding on a pan granulator of 70 cm diameter and residence times of 5 to 10 minutes. The granulated material obtained had a grain size of 0.2 to 2 mm with a $d_{50}$ of 0.69 mm. It was practically dust-free, pourable and sufficiently stable in transport.

Working into cement mortar yielded a relative tinting strength of 98% compared with the powdered pigment.

In working into asphalt, the color effect obtained corresponded visually to the shade obtained with powder. The difference in the red shade a* compared with the powder standard was 0.0 units.

EXAMPLE 2

25kg Chromoxid GN (commercial product of Bayer AG) were treated with 3% Machine Oil V 100 as described in Example 1. The complete conversion of the pigment powder to the granular form led to a $d_{50}$ of 0.53 mm.

Working into cement mortar yielded a relative tinting strength of 99% compared with the starting material.

EXAMPLE 3

25 kg Iron Oxide Red 130 (commercial product of Bayer AG) were granulated with 2.5% vegetable oil (sunflower oil, kinematic viscosity at 40° C. 23 mm²/s) according to Example 1.

The granulated material in cement mortar yielded a relative tinting strength of 97% compared with the starting powder.

EXAMPLE 4

25 kg Iron Oxide Red Bayferrox 230 A (commercial product of Bayer AG) were granulated according to Example 1 and worked into asphalt. The color effect obtained in asphalt corresponded visually to the shade obtained with powder. The difference in the red shade a* was −0.3 units compared with the powder state.

Comparative Example 1

25 kg Iron Oxide Red Bayferrox 130 were mixed with 3% Machine Oil V 100 in a high-speed mixer (Lödige PM 50 make with chopper firm of Lödige D-4790 Paderborn) at 130 rpm for 10 minutes. In the course of this, only a part was granulated, and a large part was present was dust.

EXAMPLE 5

10 kg Iron Oxide Red Bayferrox 130, granulated according to Example 1, were in addition coated with 300 g (3%) molten paraffin in a dragee drum. The color effect obtained in asphalt corresponded visually to the shade obtained with powder. The difference in the red shade a* was −0.2 units compared with the powder standard.

Comparative Example 2

3 kg Iron Oxide Red Bayferrox 130 were mixed for 3 minutes in a mixer-granulator of the firm of Eirich, D-6969 Hardheim, with the addition of 5, 10 and 20% of Machine Oil V 100. The rotation speed of the mixer was 84 rpm and that of the spinner 1500 rpm. At 5 and 10% added oil, only a part was pelletized, a large part being present as dust. Only at 20% added oil was the whole material pelletized. 20% added oil is unacceptable for technical and economic reasons (binder costs, loss of tinting strength, strength).

EXAMPLE 6

The granulated material from Example 3 was worked into asphalt. The color effect obtained corresponded visually to the shade obtained with powder. The difference in the red shade a* was −0.1 units compared with the powder standard.

EXAMPLE 7

25 kg Iron Oxide Red Bayferrox 130 were granulated as described in Example 1 with the addition of 1% sodium hexametaphosphate (Graham's salt) as a 20% solution. The granulated material obtained had a grain size of 0.2–2 mm. Working into cement mortar yielded a relative tinting strength of 95% compared with the powdered pigment. The granulated material was after-dried in the drying oven. Working the dried granulated material into cement mortar yielded a tinting strength of 94% compared with the powder pigment.

Comparative Example 3

100 kg Iron Oxide Red Bayferrox 130 were compacted in the compactor at line forces of 25 kN/cm and rough-ground. The dust fraction was removed and the granulated material of 0.2 to 1 mm chips tested in cement mortar, The relative tinting strength was only 70%,

TABLE 1

Combinations of the process steps mixer (A), compactor (B), screen granulator (C), pan granulator (D)
Examination of the properties of the granulated materials, flow behaviour and transportability

| No. | Combination | | transportability | flow test | powder component <125 μ |
|---|---|---|---|---|---|
| 1 | A | dust component too high at binder contents <10% | — | | **) |
| 2 | B | high line-forces → poor dispersibility | | — | 1–3% |
| | | low line-forces → poor flow behaviour, dust component | | — | 3–10% |
| 3 | C | too little strength, dust component | | — | **) |
| 4 | D | controllable only with great effort; coarse and dust components | | — | 1–5% |
| 5 | A + B | dispersibility of large flakes is poor | — | — | 1–10% |

TABLE 1-continued

Combinations of the process steps mixer (A), compactor (B), screen granulator (C), pan granulator (D)
Examination of the properties of the granulated materials, flow behaviour and transportability

| No. | Combination | | transportability | flow test | powder component <125 μ |
|---|---|---|---|---|---|
| | | | | Examination of granulated material | |
| 6 | A + C | like C | – | – | **) |
| 7 | A + D | like D | – | – | 1–5% |
| 8 | B + C | like B, high dust component, since without binder | – | – | 5–10% |
| 9 | B + D | dispersibility of large flakes is poor | – | – | 1–3% |
| 10 | C + D | like D | – | – | 1–5% |
| 11 | A + B + C | like B + C | – | – | 5% |
| 12a | A + C + D | high throughput on the rotating pan like 14 → only transportable with strong knocking | – *) | – | 0.5% |
| 12b | A + C + D | low throughput → good dispersibility, good flow behaviour | + | + | <0.5% |
| 13 | B + C + D | low strength, since without binder | | + | 2–5% |
| 14 | A + B + C + D | good dispersibility, good flow and transport behaviour, no recycle of dust components necessary | + | ++ | <0.5% |

*) only transportable with strong knocking
**) sieve analysis impossible, as a result of too low a strength, abrasion and pelletizing on the sieve

What is claimed is:

1. Process for producing granules for the colouration of building materials selected from the group consisting of concrete and asphalt by granulated inorganic pigments, wherein inorganic pigments are mixed with at least one binder selected from the group consisting of lignin sulphonates, formaldehyde condensates, gluconic acid, sulphated polyglycol ethers, solutions of inorganic salts, water, oils, aqueous solutions of polysaccharides and aqueous solutions of cellulose ethers, with formation of a cohesive powder, this powder is subjected to a compacting stage at line forces of 0.1 to 15 kN/cm to form flakes having a density of 0.5 to 3.0 g/cm$^3$, the flakes are then broken down by subsequent rough-grinding on a screen granulator into pregranulate and powder and these are completely pelletized by rerolling on a rotating pan or in a rotating drum to form the granulated pigments which are then mixed with the building materials.

2. Process according to claim 1, wherein the line forces amount to 0.5 to 10 kN/cm.

3. Process according to claim 1, wherein the inorganic pigments are selected from the group consisting of iron oxide pigments, titanium dioxide pigments, chromic oxide pigments and rutile mixed phase pigments.

4. Process according to claim 1, wherein the binder is an aqueous solution of at least one salt selected from the group consisting of phosphates, silicates, aluminates and borates.

5. Process according to claim 1, wherein the at least one binder is used in amounts of 0.1 to 10 wt %.

6. Process according to claim 1, wherein the binder is water.

7. Process according to claim 1, wherein the binder is used in an amount of between 0.1 to 10 wt. % and the at least one binder consists essential of an aqueous solution containing up to 50% of a substance selected from the group consisting of salts, polysaccharides and cellulose ethers.

8. Process according to claim 1, wherein the binder consists essentially of at least one oil selected from the group consisting of vegetable oils, animal oils, fish oils and synthetic oils in an amount of 0.01 to 6 wt %.

9. Process according to claim 1, wherein the binder consists essentially of at least one oil with a kinematic viscosity of 1.6 to 1500 mm$^2$/s at 40° C. according to DIN 51 562.

10. Process according to claim 1, wherein the granules consist essentially of
   at least one pigment selected from the group consisting of iron oxide pigments, titanium dioxide pigments, chromic oxide pigments, and rutile mixed phase pigments and
   at least one binder selected from the group consisting of vegetable oils, animal oils, fish oils, refined crude oils and synthetic oils.

11. Process according to claim 1, wherein the granulated pigments are dried after the pelletizing step.

12. Process according to claim 2, wherein the inorganic pigments are selected from the group consisting of iron oxide pigments, titanium dioxide pigments, chromic oxide pigments and rutile mixed phase pigments.

13. Process according to claim 2, wherein the binder is at least one oil selected from the group consisting of refined crude oils, vegetable oils, animal oils, fish oils and synthetic oils.

14. Process according to claim 3, wherein the binder is at least one oil selected from the group consisting of synthetic oils, rapessed oil, soya bean oil, maize germ oil, olive oil, coconut oil, sunflower oil and fish oils.

15. Process according to claim 1, wherein the binder is an organic binder selected from the group consisting of lignin sulphates formaldehyde condensates, gluconic acid and sulphated polyglycol ethers and the binder is used in amounts of from 0.01 to 6 wt %.

16. Process according to claim 3, wherein the at least one binder is used in amounts of 0.1 to 10 wt %.

17. Process according to claim 3, wherein the binder is water.

* * * * *

UNITED STATES PATENT AND TRADEMARK OFFICE
CERTIFICATE OF CORRECTION

PATENT NO. : 5,484,481
DATED : January 16, 1996
INVENTOR(S) : Linde et al.

It is certified that error appears in the above-indentified patent and that said Letters Patent is hereby corrected as shown below:

In Column 7, line 56, "essential" should be --essentially--; in Column 8, line 50, "rapessed" should --rapeseed--; and in Column 8, line 54, "sulphates" should be --sulphonates,---.

Signed and Sealed this

Twenty-second Day of October, 1996

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO. : 5,484,481
DATED : January 16, 1996
INVENTOR(S) : Linde, et. al.

It is certified that error appears in the above-indentified patent and that said Letters Patent is hereby corrected as shown below:

In Column 4, line 14, "(reference sample = 100% are evaluated (DIN 5032, DIN" should be --(reference sample = 100%) are evaluated (DIN 5033, DIN--.

Signed and Sealed this

Nineteenth Day of November, 1996

Attest:

BRUCE LEHMAN

*Attesting Officer*        *Commissioner of Patents and Trademarks*